United States Patent
Kray et al.

(10) Patent No.: US 8,763,753 B2
(45) Date of Patent: Jul. 1, 2014

(54) ACOUSTIC PANEL AND METHOD OF FORMING

(75) Inventors: Nicholas Joseph Kray, Mason, OH (US); Seth Alexander McDonald, Cincinnati, OH (US); Benjamin Roby, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/371,029

(22) Filed: Feb. 10, 2012

(65) Prior Publication Data

US 2013/0206503 A1  Aug. 15, 2013

(51) Int. Cl.
*E04B 1/82* (2006.01)

(52) U.S. Cl.
USPC ............ 181/292; 181/210; 181/213; 415/119

(58) Field of Classification Search
USPC ......... 181/210, 213, 214, 222, 288, 290, 292, 181/293; 415/119; 52/787.1, 787.11
See application file for complete search history.

(56) References Cited

U.S. PATENT DOCUMENTS

| | | | | |
|---|---|---|---|---|
| 2,607,447 | A | * | 8/1952 | Tuttle .......................... 52/787.12 |
| 2,957,196 | A | * | 10/1960 | Delgadillo et al. ............... 16/2.1 |
| 3,443,473 | A | * | 5/1969 | Tritt ................................. 411/38 |
| 3,451,181 | A | * | 6/1969 | Neuschotz .................... 52/787.1 |
| 3,526,072 | A | * | 9/1970 | Campbell ..................... 52/787.1 |
| 3,977,146 | A | * | 8/1976 | Wiley ........................... 52/787.1 |
| 4,106,587 | A | | 8/1978 | Nash et al. |
| 4,671,841 | A | | 6/1987 | Stephens |
| 5,275,529 | A | | 1/1994 | Langenbrunner et al. |
| 5,498,127 | A | | 3/1996 | Kraft et al. |
| 6,123,171 | A | | 9/2000 | McNett et al. |
| 6,766,639 | B2 | | 7/2004 | Malmborg |
| 6,920,958 | B2 | | 7/2005 | Harrison |
| 7,047,725 | B2 | | 5/2006 | Moe et al. |
| 7,090,165 | B2 | | 8/2006 | Jones et al. |
| 7,255,528 | B2 | | 8/2007 | Stretton |
| 7,503,425 | B2 | | 3/2009 | Strunk |
| 7,563,069 | B2 | | 7/2009 | Harper |
| 7,588,212 | B2 | | 9/2009 | Moe et al. |
| 7,866,939 | B2 | | 1/2011 | Harper et al. |
| 7,923,668 | B2 | | 4/2011 | Layland et al. |
| 8,028,802 | B2 | | 10/2011 | Durcholz et al. |
| 8,052,377 | B2 | | 11/2011 | Coney et al. |
| 2004/0065501 | A1 | | 4/2004 | Tong et al. |
| 2004/0237502 | A1 | | 12/2004 | Moe et al. |
| 2004/0238687 | A1 | | 12/2004 | Jones et al. |
| 2005/0082112 | A1 | | 4/2005 | Harrison |
| 2005/0089391 | A1 | | 4/2005 | Stretton |
| 2006/0137294 | A1 | * | 6/2006 | Waits Jr. et al. ............... 52/787.1 |
| 2008/0069688 | A1 | | 3/2008 | Harper et al. |
| 2008/0078612 | A1 | | 4/2008 | Strunk |
| 2008/0112796 | A1 | | 5/2008 | Coney et al. |
| 2008/0179448 | A1 | | 7/2008 | Layland et al. |
| 2008/0302060 | A1 | * | 12/2008 | Ciprian ...................... 52/787.12 |

(Continued)

*Primary Examiner* — Jeremy Luks
(74) *Attorney, Agent, or Firm* — General Electric Company; William Scott Andes

(57) ABSTRACT

A disclosed embodiment provides an acoustic panel having a composite laminate panel having a back sheet layer, a face sheet layer, and a core layer disposed therebetween. The core layer has one or more depressions at an interface between the core layer and the face sheet layer, with the face sheet having a generally uniform thickness across the composite laminate panel. A hole extends through the composite laminate panel at the depressions, and a bolt assembly extends through the hole such that it is countersunk.

18 Claims, 5 Drawing Sheets

(56) References Cited

U.S. PATENT DOCUMENTS

| | | |
|---|---|---|
| 2009/0014234 A1 | 1/2009 | Bagnall |
| 2009/0277153 A1 | 11/2009 | Harper et al. |
| 2009/0321178 A1 | 12/2009 | Durchholz et al. |
| 2009/0324390 A1 | 12/2009 | Harper et al. |
| 2010/0126971 A1 | 5/2010 | Calder et al. |
| 2010/0206664 A1 | 8/2010 | Bagnall |
| 2011/0056718 A1* | 3/2011 | Gattus et al. ............ 174/2 |

* cited by examiner

ACOUSTIC PANEL AND METHOD OF FORMING

BACKGROUND

The disclosed embodiments generally pertain to acoustic panels and specifically to structural elements therein to secure them.

SUMMARY

A first embodiment provides an acoustic panel having a composite laminate panel having a back sheet layer, a face sheet layer, and a core layer disposed therebetween. The core layer has one or more depressions at an interface between the core layer and the face sheet layer. The face sheet may have a generally uniform thickness across the composite laminate panel. A hole extends through the composite laminate panel at the depressions, and a bolt assembly extends through the hole such that it is countersunk.

Another aspect of the apparatus provides apertures in an exposed surface of the face sheet layer.

Yet another aspect provides that the bolt assembly is provided with a two-piece bushing.

Yet another embodiment of the present disclosure provides a method for manufacturing a face sheet layer. A tip mandrel may be utilized to provide with holes through the face sheet. Boss pucks may be heat welded into these holes such that they protrude above a surface of the tip mandrel. An uncured face sheet layer material may then be placed on the tip mandrel. A preformed caul sheet may then be placed upon the face sheet layer. The caul sheet may be provided with depressions that correspond in location to the boss pucks and also correspond in geometry to the depressions on the core layer. The entire assembly is then compressed to cure the face sheet layer.

BRIEF DESCRIPTION OF THE ILLUSTRATIONS

Embodiments of the apparatus and method are illustrated in the following illustrations.

DETAILED DESCRIPTION

Figure 1:
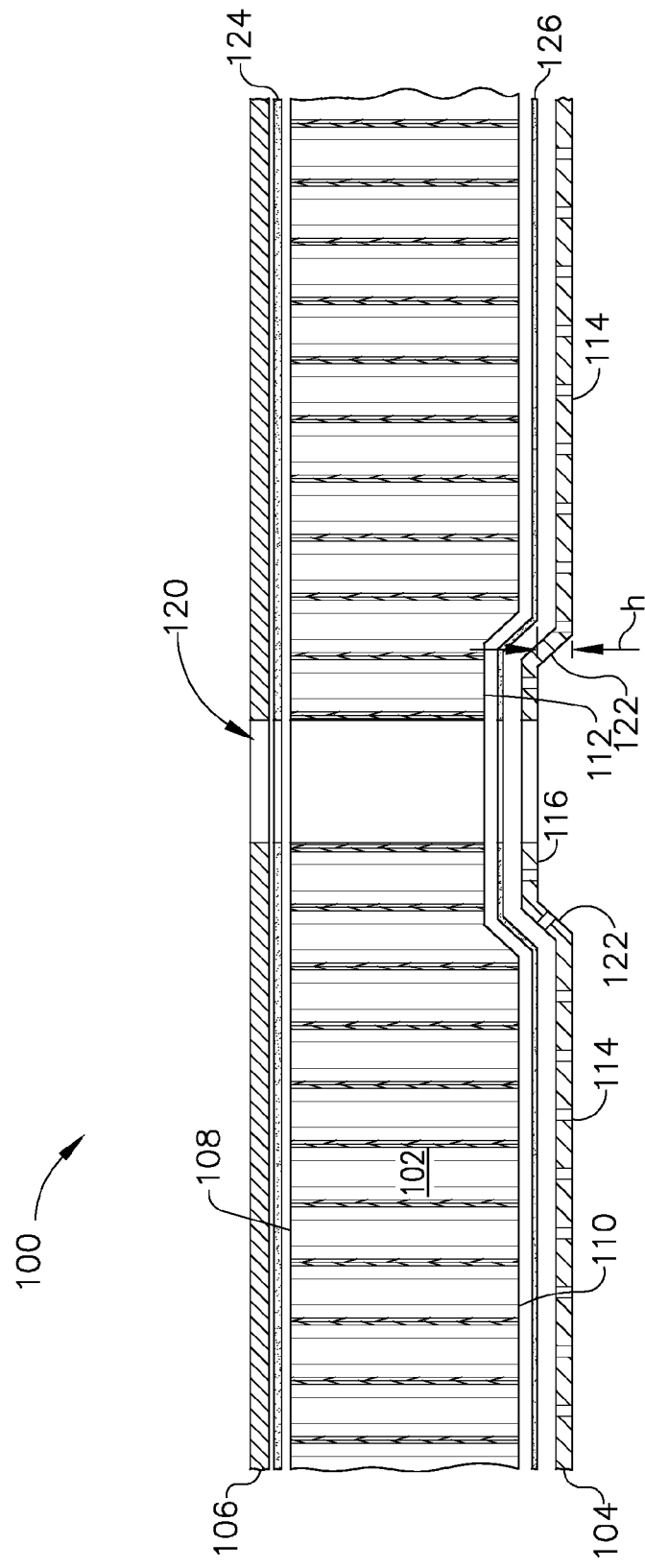
FIG. 1 is a cross-sectional view of an embodiment of a partially assembled acoustic panel.

Referring now to FIG. 1, an embodiment of an acoustic panel 100 is provided. The exemplary embodiments of the acoustic panel 100 may be used with, for example, internal surfaces of aircraft engines and more specifically, by way of example, in the fan compartment area of the engine. The acoustic panel is provided with a core layer 102, which may have, for example, a honey-comb cross-sectional geometry extending from a first core layer surface 110 toward a second core layer surface 108. Other geometries may be used however such as a plurality of cylindrical cross-sections or polygonal cross-sections. The core layer has a thickness which will allow for dissipation of acoustic energy therein. The core layer 102 may be formed of various materials including, but not limited to, aluminum or fiberglass coated with phenolic resin. The core layer 102 may be disposed between a face sheet layer 104 and a back sheet layer 106. The terms face sheet and back sheet are defined relative to the airflow through the aircraft engine. The face sheet layer 104 is exposed to or closer to the flow path of air through the aircraft engine, for example, while the back sheet layer 106 is disposed further or away from the flow path of air. The back sheet layer 104 is preferably bonded to the core layer on a back surface 108 and the face sheet layer is preferably bonded to the core layer 102 on an opposed face surface 110. The face sheet layer 104 and back sheet layer 106 generally function as skins for the acoustic panel.

Figure 2:
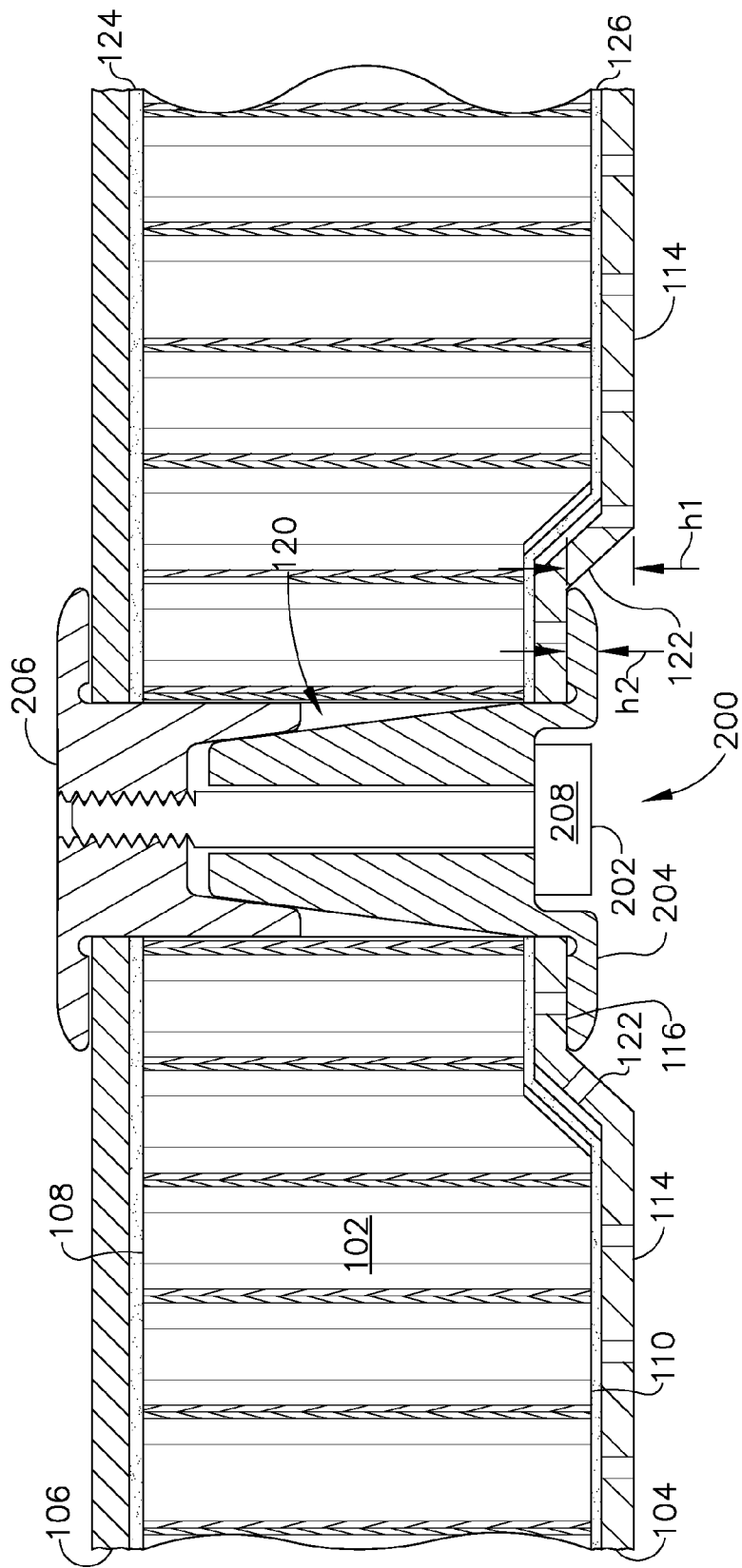
FIG. 2 is a cross-sectional view of an embodiment of an acoustic panel.

Referring now to FIGS. 1 and 2, the core layer has one or more depressions 112 on the core layer face 110. The core layer depressions 112 receive positionally corresponding depressions of the face sheet layer 104. The face sheet layer 104 has a generally uniform thickness and generally conforms to the one or more depressions 112 on the core layer face 110. The face sheet layer 104 may have an exposed surface 114, and, within the one or more face sheet depressions, a depression surface 116. A height h1 may exist between the exposed surface 114 and the depression surface 116. A hole 120 may be provided within the one or more depressions 112 that extends through the back face layer 106 and through the depression surface 116. The hole 120 allows for placement of a bolt assembly 200 described further herein.

The face sheet layer 104 may also have a plurality of apertures (not shown) on the exposed surface 114. The apertures allow sound to pass through the face sheet surface 114 and enter the core layer 102 for sound damping. The apertures may be randomly sized, shaped and spaced or alternatively may be selectively sized, shaped and spaced, or some combination thereof.

A bolt assembly 200 may be provided to extend through the hole 120. The bolt assembly 200 may be provided with a bolt 202 and a two-piece bushing 204, 206. The two-piece bushing 204, 206 may be provided with a front piece 204 and a back piece 206. The bolt 202 may extend through the bushing 204, 206 such that the bolt head 208 abuts the front piece 204. The bolt 202 extends into the back piece 206 and, according to one exemplary embodiment, threadably engages the back piece 206. As the bolt 202 is tightened, the front piece 204 and back piece 206 are squeezed together capturing the face sheet layer 104, core layer 102 and back sheet layer 106. Additionally however, the back piece and front pieces may be affixed with adhesive solely or in addition to the mechanical fastening. Further, the front piece 204 may be designed to extend through the back piece 206 forming a stand-off on the rear or back side of the panel 100.

The front piece bushing 202 and bolt head 206 extend from the depression surface 116 at a height h2 that is less than the height h1 between the depression surface 116 and the exposed surface 114, such that it is countersunk with respect to the exposed surface 114. The back piece 206 extends from the opposite side of the composite panel structure at the back sheet layer 106. The resulting assembly provides a two-piece bushing bolt assembly 200 that sandwiches the back sheet layer 106, the core layer 102, and the face sheet layer 104. Flanges 210 of the front and back pieces 204, 206, may be fixed additionally with an adhesive. However, with instant embodiments, adhesive having a lesser shear strength may be utilized since the assembly provides the unexpected result of having a primary load path through flanges of the bushings 204, 206 at the face sheet layer 104 and back sheet layer 106, rather than thru any epoxy within the core layer 102. A transition surface 122, such as, for example, a taper or fillet, may be provided between the exposed surface 114 and the depression surface 116.

Figure 3:
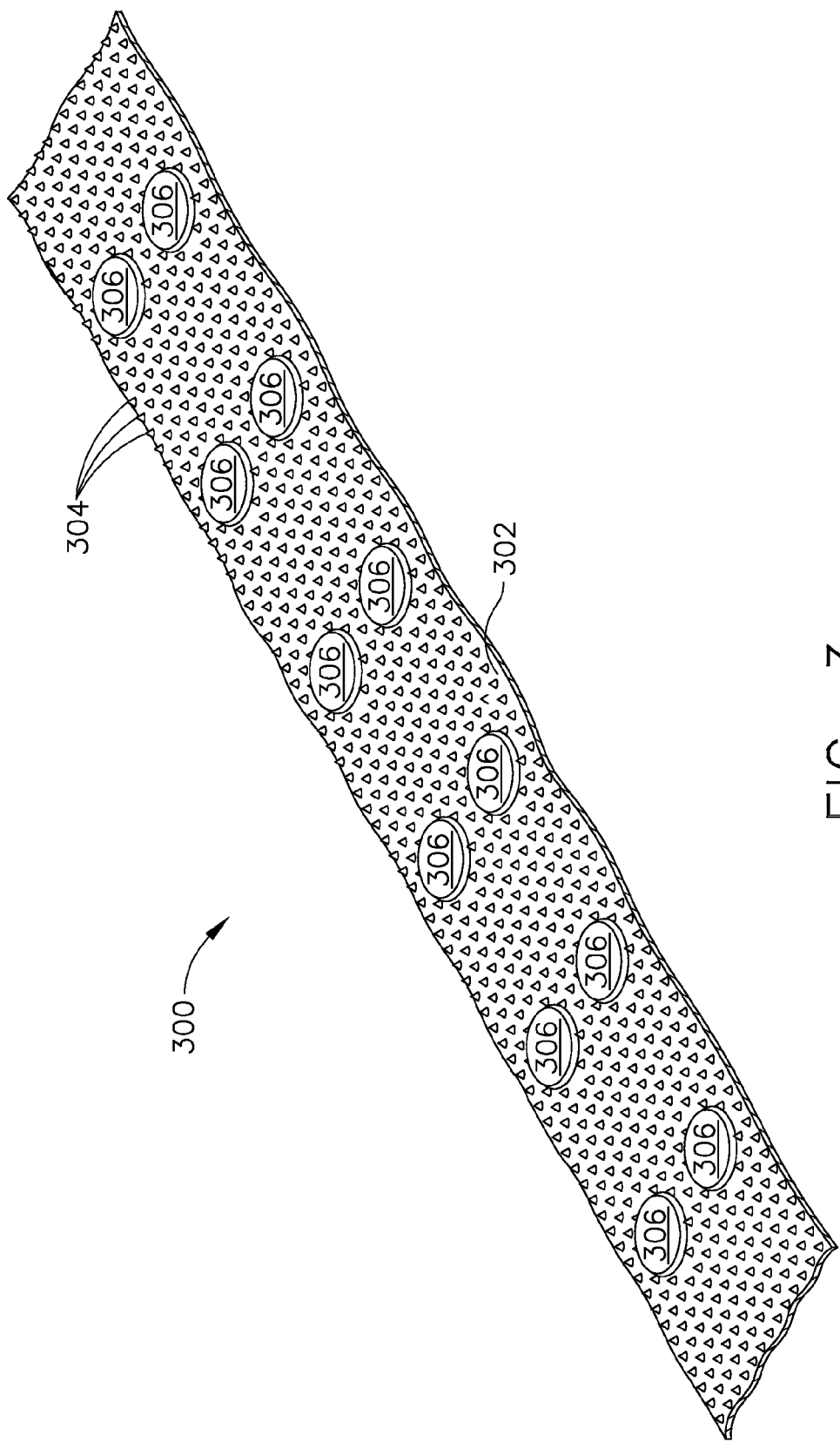
FIG. 3 is a perspective view of an embodiment of a tip mandrel sheet as may be used in manufacturing a component.

The face sheet layer 104 may be provided with one or more holes or apertures (not shown) on the exposed surface 114, which may assist in damping acoustic noise. Referring now to FIG. 3, the face sheet layer 104 (see FIG. 5) may be manufactured using a polymer tip mandrel 300. The tip mandrel 300 may have a surface 302 that is provided with a plurality of tips or protrusions 304. The tip mandrel 300 may be formed by a variety of methods, including, for example, injection molding. Further, the tip mandrel may be formed of other materials such as metals or silicone rubber for example. During manufacture of the face sheet 104, the tip mandrel 300 engages the face sheet layer 104 and creating the apertures in the face sheet 104. The apertures allow sound to pass through the face sheet layer 104 and reach the core layer 102 for damping.

Figure 4:
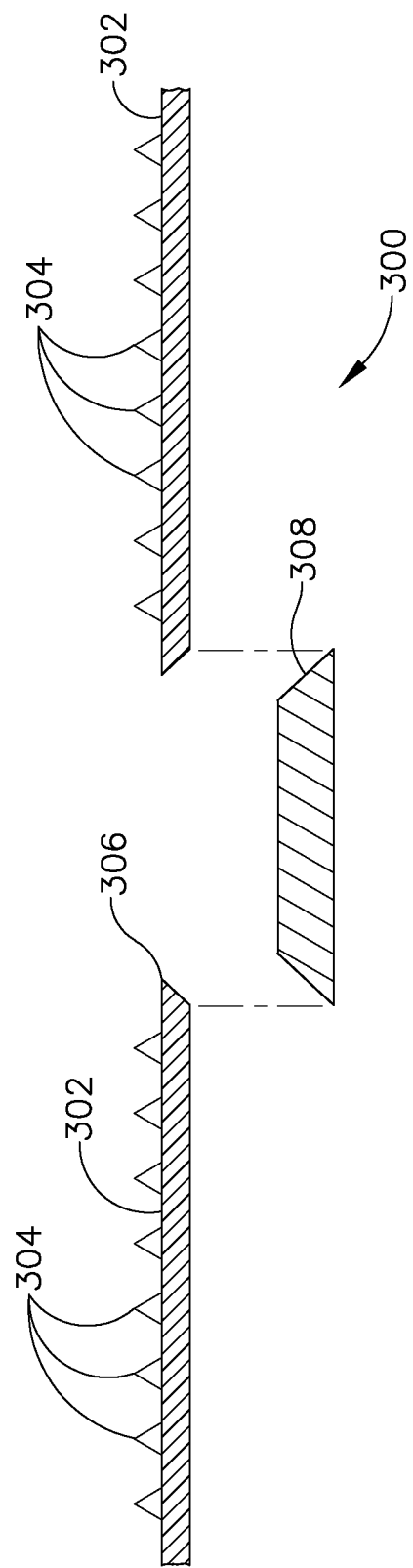
FIG. 4 is a cross-sectional exploded assembly view of a portion of the tip mandrel sheet of FIG. 3.

Referring now to FIGS. 3 and 4, the tip mandrel 300 may also be provided with one or more holes 306 therethrough that correspond to depressions 112 on the acoustic panel 100. A boss puck 308 may be heat welded in each of the one or more holes 306 such that it protrudes above the surface 302 that is provided with a plurality of tips 304. According to one embodiment, the boss puck may be plastic or alternatively may be metallic or even further alternative materials. The boss puck 308 may also be adhered, affixed or loosely positioned in place for use during manufacture as alternatives to the heat welding. Additionally, the boss puck 308 may extend to a height greater than that of the tips 304. During manufacture of the face sheet layer 104, the boss puck 308 will form the depression surface 116 and transition surfaces 122 (FIG. 2) in the face sheet layer 104.

Figure 5:
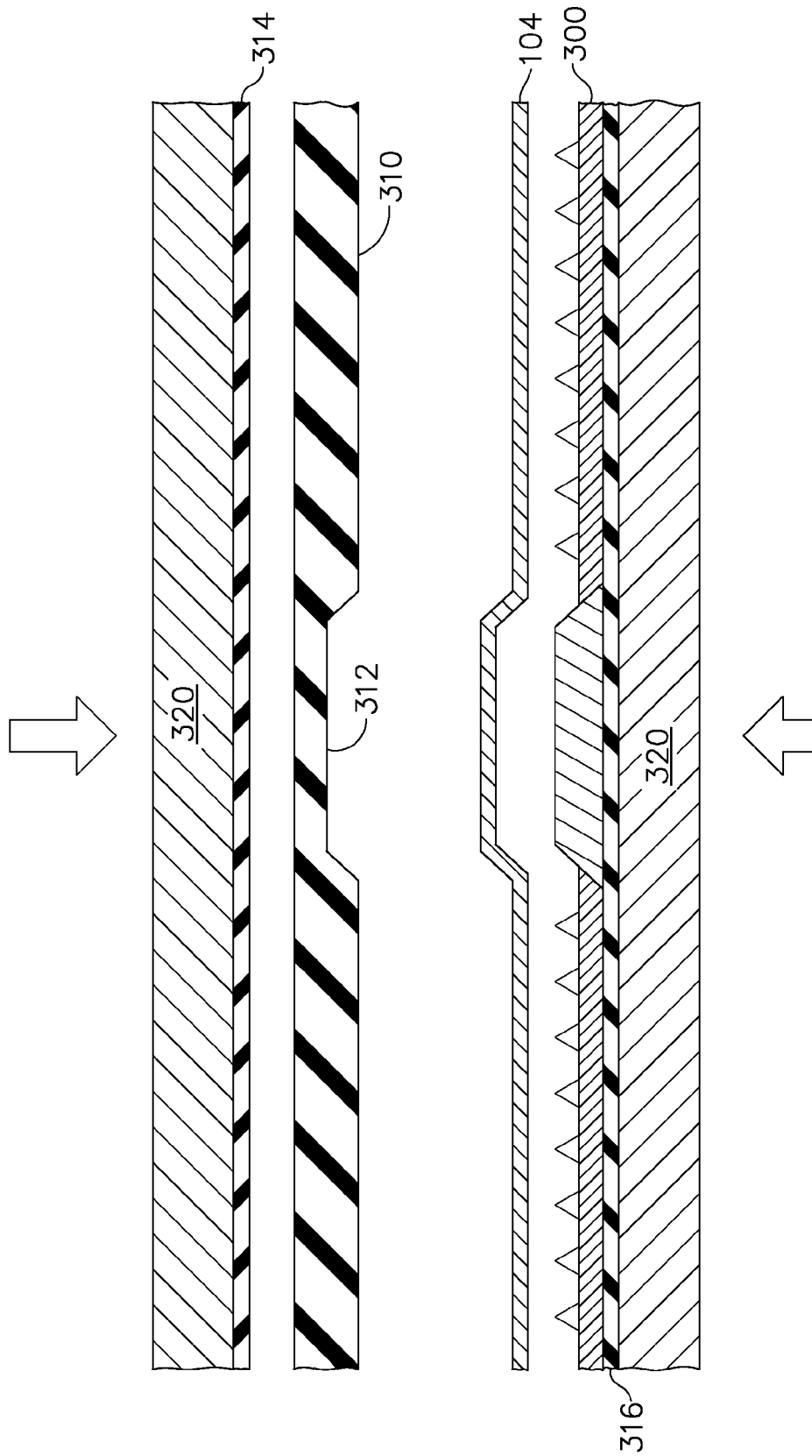
FIG. 5 is a cross-sectional view of an embodiment detailing manufacture of a face sheet layer.

Referring now to FIG. 5, the face sheet layer 104 may be manufactured of a pre-impregnated fiberglass or carbon material. This material is applied to the tip mandrel 300 and a silicone rubber caul sheet 310 is placed upon that. The silicone rubber caul sheet 310 is provided with a depression 312 that generally mimics that of the one or more depressions 112 on the above-discussed core layer 102. A silicone rubber sheet 314 is placed on the caul sheet 310 and a second silicone rubber sheet 316 is placed on the opposite side of the tip mandrel 300. This assembly is placed between two platens 320 to compress the materials and cure the face sheet 104. The silicone rubber caul sheet 310 provides an equal application of pressure when the face sheet layer 104 is formed between platens 320. Additionally, the depression 312 in the silicone caul sheet 312 provides an allowance for material moved in creating the depression of the face sheet layer 104. The face sheet 104 is now removed having a preformed contour that matches a depression 112 on the core layer 102.

Referring back to FIGS. 1 and 2, the core layer 102 is provided with depressions 112 machined thereon. The depressions 112 may be formed in a variety of manners including, but not limited to, grinding.

Once the various components are formed, they are assembled to form the composite acoustic panel. The back sheet layer 106 may be bonded to a back surface 108 of the core layer 102, and may preferably be bonded with an adhesive 124 therebetween. For example, an epoxy film adhesive may be utilized to combine the back sheet layer 106 and the core layer 102. The face sheet layer 104 may also be bonded to the front surface 110 of the core layer 102, either at the same time or after the back sheet layer 106 is bonded, and may preferably be bonded with an adhesive layer 126 therebetween. A hole 120 may be machined through all layers in each of the one or more depressions 112 on the assembly 100. The at least one hole 120 may be formed before the layers are combined or after the panel is formed. The bolt assembly 200 may then be inserted in the hole 112 according to the exemplary embodiment of FIG. 2.

The foregoing written description of structures and methods has been presented for purposes of illustration. Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible. The patentable scope of the disclosure is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An acoustic panel, comprising:
   a composite laminate panel having a back sheet layer, a face sheet layer, and a core layer disposed between said back sheet layer and said face sheet layer;
   wherein said core layer has one or more depressions at an interface between said core layer and said face sheet layer;
   wherein said face sheet layer conforms to said one or more core layer depressions, and has a depression surface within said one or more depressions and a face surface at all other locations not within said one or more depressions, said face surface being substantially parallel to said depression surface, a transition surface extending between said face surface and said depression surface;
   and wherein said face sheet layer has a generally uniform thickness across said face surface and said depression surface;
   wherein said one or more depressions have a depth as measured between said depression surface and said face surface;
   a hole located in said depression surface and through said one or more depressions extending through said core layer;
   a bolt assembly extending through said hole, said bolt assembly including a first bushing extending into said core layer, wherein a flange of said first bushing extends above said depression surface at a height that is less than said depth of said one or more depressions and said flange is disposed on said depression surface;
   said bolt assembly further comprising a second bushing at said back sheet layer, said first and second bushing both extending into said core layer.

2. The acoustic panel of claim 1 wherein said back sheet layer is bonded to said core layer.

3. The acoustic panel of claim 1 wherein said face sheet layer is bonded to said core layer.

4. The acoustic panel of claim 1 wherein said bolt assembly comprises a bolt extending through said first and second bushings.

5. The acoustic panel of claim 1 wherein said face sheet layer has a plurality of apertures within said face surface.

6. The acoustic panel of claim 1 wherein said depression surface is generally flat.

7. The acoustic panel of claim 1 wherein said core layer has a honeycomb cross-section extending between said face sheet layer and said back sheet layer.

8. An acoustic panel comprising:
a composite laminate panel having:
a back sheet layer which may be positioned opposite an air flow path;
a core layer bonded adjacent said back sheet layer, said core layer acoustically damping noise, said core layer having at least one depression on a side of said core layer adjacent a face sheet layer;
said face sheet layer bonded to said core layer and capable of being positioned adjacent said air flow path, said face sheet layer having a face sheet surface and at least one depression surface substantially parallel to said face sheet surface, said at least one depression surface positionally corresponding to said at least one depression, said at least one depression surface having a depression surface hole aligned with a depression hole extending through said core layer;
a bolt assembly including a bolt and a front bushing piece extending through said hole of said face sheet layer, a rear bushing piece capturing said back sheet layer and engaging said front bushing piece, said front and back bushing pieces engaging one another within said core layer, said bolt threadably engaging said at least one bushing, a flange of said bolt assembly disposed against said depression surface and said flange having a height which is less than a height between said face sheet surface and said at least one depression surface.

9. The acoustic panel of claim 8, said panel further comprising a hole in said back sheet layer.

10. The acoustic panel of claim 8 further comprising a plurality of apertures in said face sheet for acoustical treatment.

11. The acoustic panel of claim 8, said bolt extending through said front bushing piece and engaging said back bushing piece.

12. A method of forming an acoustic panel, comprising the steps of:
forming a face sheet layer having an outermost surface, at least one depression surface being substantially parallel to said outermost surface, and a hole;
forming at least one depression in a core layer, a position of said depression surface corresponding to a position of said depression of said core layer;
bonding said face sheet layer of a composite mixture to said core layer;
bonding a back sheet layer to said core layer;
positioning a bolt assembly through said acoustic panel and capturing said face sheet, said core layer and said back sheet, said bolt assembly comprising a front bushing piece and a second bushing piece engaging one another within said core layer, wherein said depression surface and said outermost surface define a first height, and a bolt head and a flange of said front bushing piece of said bolt assembly define a second height;
and further wherein said first height is greater than said second height.

13. The method of claim 12 further comprising bonding said bolt assembly to at least one of said face sheet layer and said back sheet layer.

14. The method of claim 12 said forming said face sheet layer comprising pressing said face sheet layer with a tip mandrel having a boss puck.

15. The method of claim 12 further comprising positioning a silicone caul sheet on said face sheet opposite said tip mandrel.

16. The method of claim 15 further comprising positioning a silicone sheet on said silicone caul sheet opposite said face sheet layer.

17. The method of claim 16 further comprising a silicone sheet adjacent disposed between said tip mandrel and a platen.

18. The method of claim 12 further comprising forming said face sheet between first and second platens.

\* \* \* \* \*